E. MAHONE.
SCRATCH HARROW.
APPLICATION FILED OCT. 28, 1909.
952,124.
Patented Mar. 15, 1910.
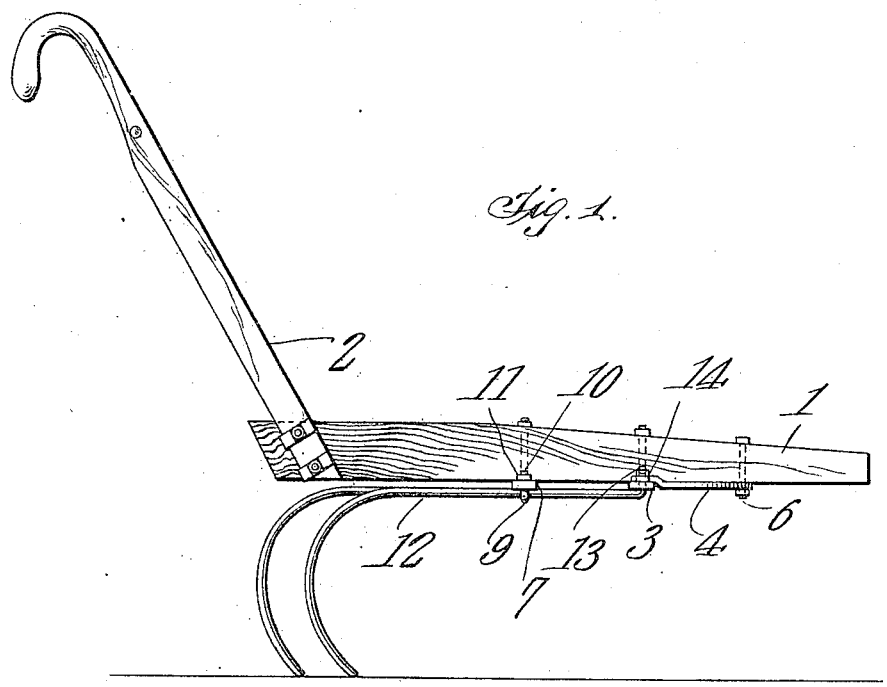
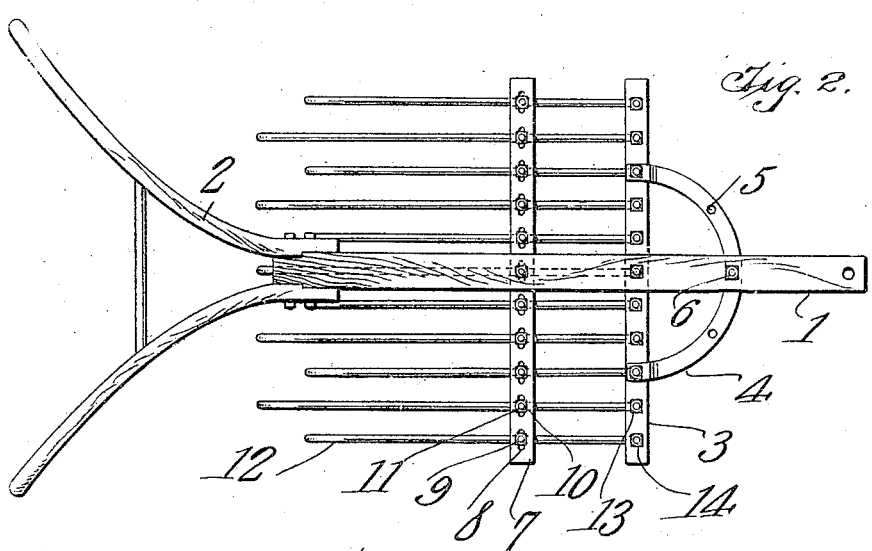
Witnesses
C. K. Stewart
J. T. Lawson
Inventor
Edward Mahone.
By C. A. Snow & Co.
Attorneys

UNITED STATES PATENT OFFICE.

EDWARD MAHONE, OF TUSKEGEE INSTITUTE, ALABAMA.

SCRATCH-HARROW.

952,124. Specification of Letters Patent. Patented Mar. 15, 1910.

Application filed October 28, 1909. Serial No. 525,090.

*To all whom it may concern:*

Be it known that I, EDWARD MAHONE, a citizen of the United States, residing at Tuskegee Institute, in the county of Macon and State of Alabama, have invented a new and useful Scratch-Harrow, of which the following is a specification.

This invention has relation to harrows and weeders and it consists in the novel construction and arrangement of its parts as hereinafter shown and described.

The object of the invention is to provide a simple harrow structure adapted to be used to advantage for harrowing the soil about small plants without subjecting the surface of the soil to an excessive tearing action.

The harrow can also be used to advantage for breaking the top crust of the soil without destroying the plants or germinating seed in the ground. Therefore it will be seen that the harrow is especially adapted to be used for garden work and combines the feature of a harrow and weeder.

With these objects in view, the structure includes a beam to which are attached handles, a cross bar pivotally attached to the beam and the ends of a segment bar attached to said cross bar. Means are provided for adjustably attaching the intermediate portion of the segment bar to the beam. A slotted cross bar is also pivotally attached to the beam and carries a series of eye bolts. Tines formed from round rods are provided with laterally disposed end portions which are bolted to the first said cross bar and the intermediate portions of the said tines pass through the eye bolts and the rear portions of the tines are downwardly and forwardly curved.

In the accompanying drawings: Figure 1 is a side elevation of the harrow, Fig. 2 is a top plan view of the same, Fig. 3 is a detail sectional view of a portion of the slotted bar.

The harrow consists of a beam 1, to the rear end of which are attached the handles 2. A cross bar 3 is pivotally attached at a point intermediate its ends to an intermediate point of the beam 1. The said bar 3 is located below the said beam. A segment bar 4 is bolted at its ends to the bar 3 and the intermediate portion of the said segment bar also lies under the beam 1. The segment bar 4 is provided with several perforations 5 through any one of which a securing bolt 6 is adapted to be passed, the said bolt being also passed through the beam and serves as means for adjustably holding the segment bar in fixed relation to the beam. A slotted bar 7 is also pivotally attached to the beam and lies below the same. The bar 7 is provided with a series of slots 8 whose long dimensions are disposed longitudinally of the said bar. Eye bolts 9 are located in the slots 8 and are provided upon their shanks 10 with threaded nuts 11. The major portion of the heads of the bolts 9 lie below the lower surface of the bar 7 while the nut 10 bears against the upper surface of the said bar.

Tines 12 are formed from round rods and are provided at their forward ends with lateral extremities 13 which pass through perforations provided in the cross bar 3 and upon the upper extremities of which are screw threaded nuts 14. The said nuts 14 serve as means for holding the forward ends of the tines 12 in engagement with the cross bar 3. The intermediate portions of the tines 12 pass through the eye bolts 9 and by the action of the nuts 11 upon the upper surface of the cross bar 3 are drawn in close contact with the lower surface of the said cross bar 7. By this assemblage of parts it will be seen that the bars 3 and 7 may be in parallel relation at a right angle to the long dimension of the beam 1 or the said bars 3 and 7 may be pitched at an acute angle to the long dimension of the beam and that the ends of the bars at either side of the beam may be forwardly or rearwardly disposed as desired. The tines 12 are parallel and when the bars 3 and 7 are swung to assume acute angles with relation to the beam the elongated slots 8 will afford sufficient play for the eye bolts 9 to permit the said tines 12 to maintain their parallel relation during such adjustment. An advantage gained by forming the tines 12 from round rods is that the said tines will have sufficient resiliency to engage the soil without unnecessarily tearing the same and at the same time will have sufficient rigidity to support the beam and the parts mounted thereon. At the same time a minimum amount of material is used in the formation of the tine.

Having described my invention, what I claim as new and desire to secure by Letters Patent is:—

1. A harrow comprising a beam, a bar bolted at a point intermediate its ends to the beam for pivotal adjustment and lying under the beam, a segment bar bolted to the first said bar at its ends and lying under the beam and having a series of perforations adapted to receive a securing bolt which passes transversely through the beam, a slotted bar bolted to the beam for pivotal adjustment, eye bolts located in the slots of the slotted bar, tines secured at their forward ends to the first said bar for pivotal adjustment and having intermediate portions lying in the eyes of the eye bolts.

2. A harrow comprising a beam, a bar pivoted at a point intermediate its ends to the beam, means for holding the said bar in an adjusted position upon its pivotal connection with the beam, a second bar pivotally connected with the beam, said second bar having a series of slots, eye bolts located in the slots and having threaded shanks which project above the said bar, nuts screw threaded upon the said shanks, tines formed from round rods having laterally disposed threaded forward ends which pass through perforations in the first said bar, nuts screw threaded upon the laterally disposed extremities of the said tines and securing the same to the first said bar, the intermediate portions of the said tines passing through the eyes of the eye bolts and held in close contact against the lower surface of the said slotted bar.

3. A harrow comprising a beam, a bar pivotally attached to the beam, a segment secured at its ends to said bar and having a series of perforations, a bolt passing transversely through the beam and adapted to pass through one of the perforations in the said segment bar, a second bar pivotally attached to the beam and having a series of slots, eye bolts located in the slots and having threaded shanks which project above the upper surface of the said slotted bar, nuts screw threaded upon the shanks of the said eye bolts, tines having laterally disposed threaded forward extremities which pass through perforations in the first said bar, nuts screwed upon the lateral extremities of the said tines and securing the forward ends of the tines to the first said bars, the intermediate portions of the tines passing through the eyes of the eye bolts and held in close contact with the lower surface of the said slotted bar.

In testimony that I claim the foregoing as my own, I have hereto affixed my signature in the presence of two witnesses.

EDWARD MAHONE.

Witnesses:
    Geo. W. Carver,
    C. W. Greene.